United States Patent [19]

Steuer

[11] 4,400,999
[45] Aug. 30, 1983

[54] DRIVE HUB FOR BICYCLES OR THE LIKE

[75] Inventor: Werner Steuer, Schweinfurt, Fed. Rep. of Germany

[73] Assignee: Fichtel & Sachs AG, Schweinfurt, Fed. Rep. of Germany

[21] Appl. No.: 190,810

[22] Filed: Sep. 25, 1980

[30] Foreign Application Priority Data

Oct. 9, 1979 [DE] Fed. Rep. of Germany ....... 2940841

[51] Int. Cl.³ .............................................. F16H 3/44
[52] U.S. Cl. ................................. 74/781 B; 192/6 A; 192/48.92
[58] Field of Search .................... 74/781 B, 750 B; 192/6 A, 47, 48.92

[56] References Cited

U.S. PATENT DOCUMENTS

| | | | |
|---|---|---|---|
| 3,135,368 | 6/1964 | Shimano | 74/781 B |
| 3,648,809 | 3/1972 | Schwerdhofer | 74/750 B |
| 4,069,725 | 1/1978 | Segawa | 74/781 B |
| 4,147,243 | 4/1979 | Segawa et al. | 74/750 B |
| 4,276,973 | 7/1981 | Fukui | 74/781 B |
| 4,294,138 | 10/1981 | Fukui | 74/781 B |

FOREIGN PATENT DOCUMENTS

| | | |
|---|---|---|
| 2536813 | 3/1977 | Fed. Rep. of Germany . |
| 2739543 | 8/1979 | Fed. Rep. of Germany . |
| 488407 | 7/1938 | United Kingdom . |
| 1036340 | 7/1966 | United Kingdom . |

Primary Examiner—Leslie A. Braun
Assistant Examiner—Lawrence J. Gotts
Attorney, Agent, or Firm—Toren, McGeady and Stanger

[57] ABSTRACT

A drive hub for a bicycle includes an axially extending hub shaft with a driver rotatably mounted on the hub shaft. A plurality of sprockets are secured to the driver in side-by-side relation. A hub sleeve laterally encloses and extends in the axial direction of the hub shaft. At one end the hub sleeve is supported on the driver and at the other end it is supported on the hub shaft. A planetary gear system encircles the hub shaft and is enclosed by the hub sleeve driver. The planetary gear system is arranged to transmit the driving force from the driver to the hub sleeve and includes a sun gear fixed on the hub shaft, a planetary gear carrier rotatably mounted on the hub shaft and an annular gear with internal gear teeth formed as an integral part of the driver. A shifting device moves a coupling member for selectively coupling the hub sleeve with one of the annular gear or a planet gear mounted on the planet gear carrier.

17 Claims, 3 Drawing Figures

DRIVE HUB FOR BICYCLES OR THE LIKE

SUMMARY OF THE INVENTION

The present invention is directed to a drive hub for bicycles or the like.

A drive hub for a bicycle includes an axially extending hub shaft with a driver secured on the hub shaft adjacent one of its ends. A plurality of sprockets in side-by-side relation are fixed to the driver. A hub sleeve extends axially from the driver toward the other end of the hub shaft and laterally encloses the hub shaft. At one end, the hub sleeve is supported on the driver and at the other end on the hub shaft. A planetary gear system is located around the hub shaft and is enclosed by the hub sleeve and the driver for effecting the transmission of the driving force from the driver to the hub sleeve. The planetary gear system includes a sun gear fixed to the hub shaft and a planet gear carrier rotatable about the hub shaft. An annular gear with internal gear teeth is rotatable about the hub shaft. At least one planet gear is mounted on the planet gear carrier for engagement with the sun gear and the internal gear teeth of the annular gear. Coupling means are arranged for optionally coupling the hub sleeve with the annular gear or the planet gear carrier. Shift means for operating the coupling means include transmission means extending through a bore in the hub shaft to the coupling means.

A drive hub of this type is known from German Offenlegungsschrift No. 25 36 813.

In this known drive hub, the planet gear carrier is formed as a single unit with the driver, and the hub sleeve is optionally coupled with the driver or the annular gear. As is well known, the annular gear rotates at a speed which is stepped up to a faster speed relative to the planet gear carrier and, thus, relative to the driver. Such an arrangement has the result that a relatively small sprocket wheel must be mounted on the bicycle crank to provide the desired total speed ratios from the crank to the hub sleeve.

Therefore, it is the primary object of the present invention to afford a drive hub of the general type mentioned above so that a sprocket wheel of conventional size can be used at the crank.

In accordance with the present invention, the annular gear is fixed to the driver.

The known drive hub has the further disadvantage that the hub sleeve has a relatively large diameter over its entire axial length. Therefore, the present invention is directed to the provision of a drive hub of the above-mentioned type with the hub sleeve having a slender shape over as large a portion of its length as possible, as is expected of such hubs used on sport bicycles.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
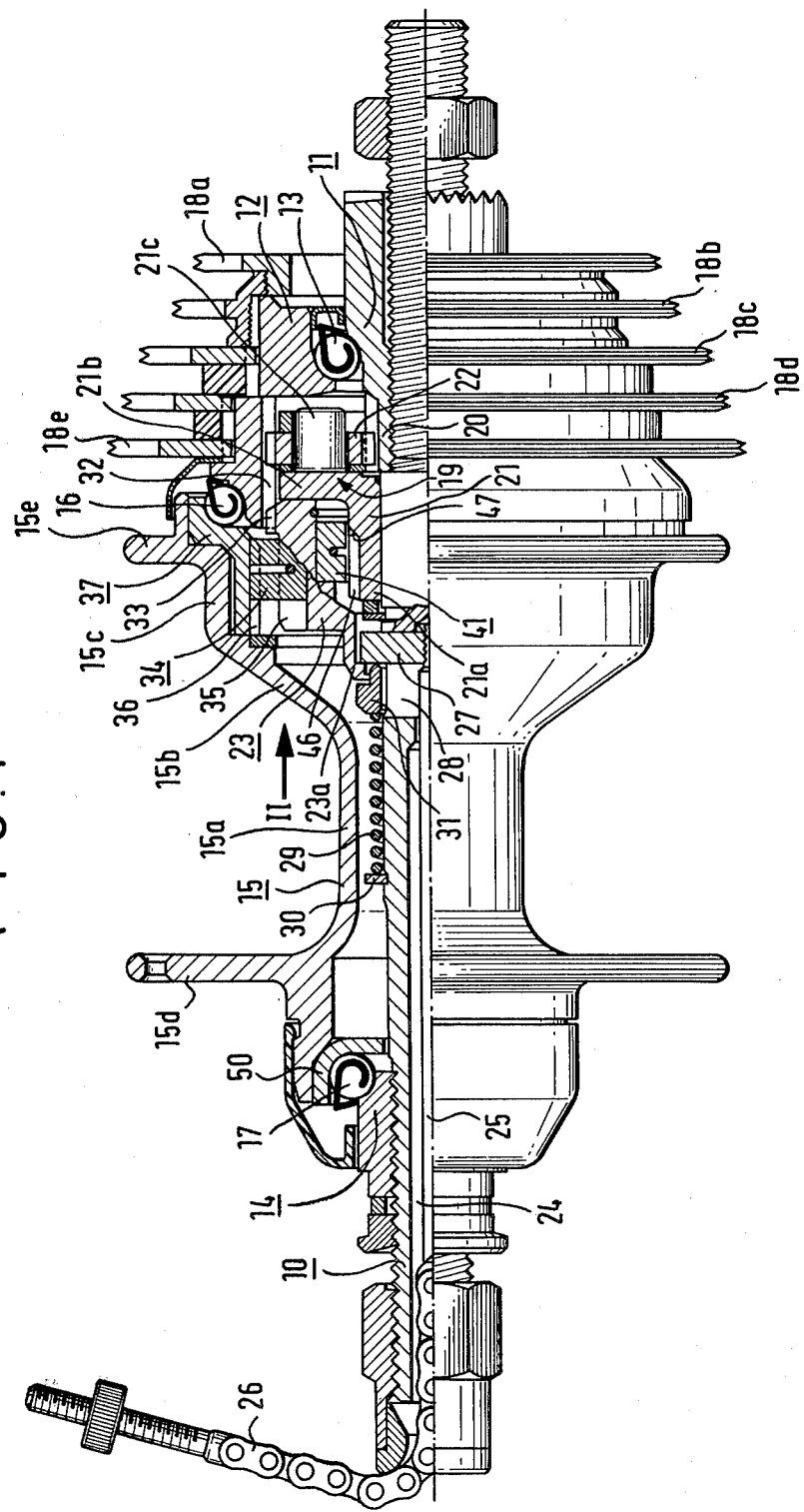
FIG. 1 is a side view, partly in longitudinal section, of a drive hub embodying the present invention.

In FIG. 1 the drive hub includes an axially extending hub shaft 10 having a first or right-hand end and a second or left-hand end. A first bearing cone 11 is positioned on the hub shaft 10 adjacent its first end. A driver 12 is supported on the bearing cone 11 via a ball bearing 13. At the opposite second end of the hub shaft 10, a second bearing cone 14 is positioned on the shaft. A hub sleeve laterally encloses the hub shaft between the driver 12 and the bearing cone 14. Hub sleeve 15 is supported on the driver by a ball bearing 16 and it is mounted on the bearing cone 14 by a ball bearing 17. Five sprockets 18a–18e arranged in side-by-side relation are fixed on the driver 12. These sprockets are part of a chain shifting mechanism or derailleur system as described in German Offenlegungsschrift No. P 27 39 543.

A planetary gear system 19 is located within the space defined radially outwardly by the hub sleeve 15 and the driver 12 and radially inwardly by the hub shaft 10. Planetary gear system 19 includes a sun gear 20 secured on the first bearing cone 11 and thus fixed on the hub shaft 10. In addition, the planetary gear system has a planet gear carrier 21 rotatably supported on the hub shaft 10 but secured thereon against axial movement. The planet gear carrier 21 is rotatably supported on the hub shaft by means of a bearing neck or sleeve 21a and the end of the neck closer to the first end of the hub shaft has a radially outwardly extending flange 21b. A planet gear bearing pin 21c is fixed on the radial flange 21b and its axis extends in parallel relation with the axis of the hub shaft. A planet gear 22 is rotatably supported on the planet gear bearing pin 21c. Planet gear 22 is in engagement with the sun gear 20 and also with the internal gear teeth 32 formed within the driver 12 which portion of the driver acts as an annular gear.

Bearing neck 21a of the planet gear carrier 21 is enclosed by a carrier ring 23. Carrier ring 23 includes a projection 23a extending toward the second or left-hand end of the hub shaft 10 as viewed in FIG. 1.

Hub shaft 10 has an axial bore 24 extending through it from the left-hand end. A pull rod 25 is located within the axial bore 24 and a pull chain 26 is connected to the left-hand end of the pull rod. Pull chain 26 extends out of the bore 24 in the hub shaft 10 and leads to a gear shift switch, not shown. At its inner end within the axial bore 24, the pull rod 25 is connected to a shift block 27 which is axially movably guided in a diametral slot 28 of the hub shaft 10. The shift block 27 engages the right-hand end of the projection 23a of the carrier ring 23, that is, the surface of the projection closer to the first end of the hub shaft. A compression spring 29 surrounds the hub shaft 10 and bears at one end against a support ring 30 on the hub shaft and at the other end against a bearing bush 31 in engagement with the projection 23a of the carrier ring and also with the shift block 27. As shown in the drawing, compression spring 29 tends to bias the shift block 27 and the carrier ring 23 toward the right into the position illustrated in FIG. 1. When the pull rod 25 is operated against the action of the spring, carrier ring 23 is moved in the leftward direction in FIG. 1 being displaced by the shift block 27 against the biasing action of the compression spring 29. Carrier ring 23 is provided with external gear teeth 33 for selective coupling or meshing engagement with the internal gear teeth 32 of the annular gear formed by the driver 12. In the shifting position illustrated in FIG. 1, the external gear teeth 33 are in engagement with the internal gear teeth 32 of the annular gear, so that the carrier ring 23 is fixed to the driver 12 so that it rotates along with it.

Figure 3:
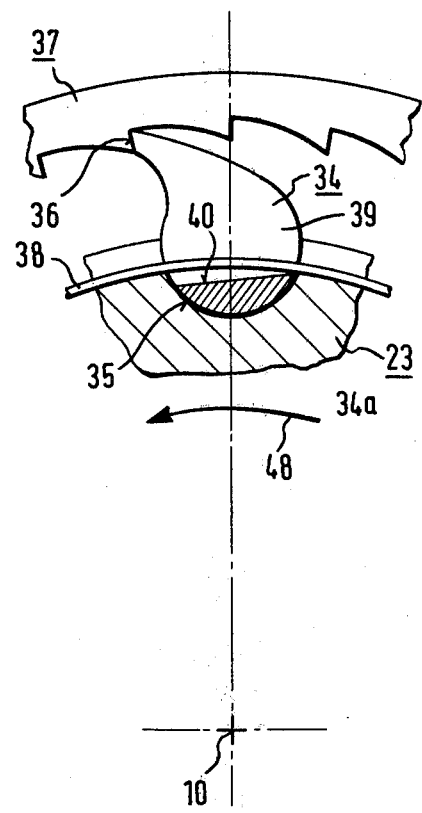
FIG. 3 is a view, partly in section, taken in the direction of the arrow II in FIG. 1 and displaying the interaction of a first pawl with first ratchet teeth.

A first pawl 34 is supported on the carrier ring 23. As shown in detail in FIG. 3, the pawl 34 is secured via a bearing head 34a in a step bearing 35 on the carrier ring 23. First pawl 34 engages first ratchet teeth 36 arranged on the inner circumferential surface of a bearing insert 37 fitted into the hub sleeve 15. Bearing insert 37 is fixed within the hub sleeve 15 so that it rotates with the sleeve and, additionally, it is provided with a bearing surface for the ball bearing 16. An annular spring 38 engages in a slot 39 in the first pawl 34 and presses against the bottom 40 of the slot tending to rotate the first pawl in the clockwise direction as viewed in FIG. 3 and, subsequently, to keep the pawl in engagement with the first ratchet teeth 36.

Figure 2:
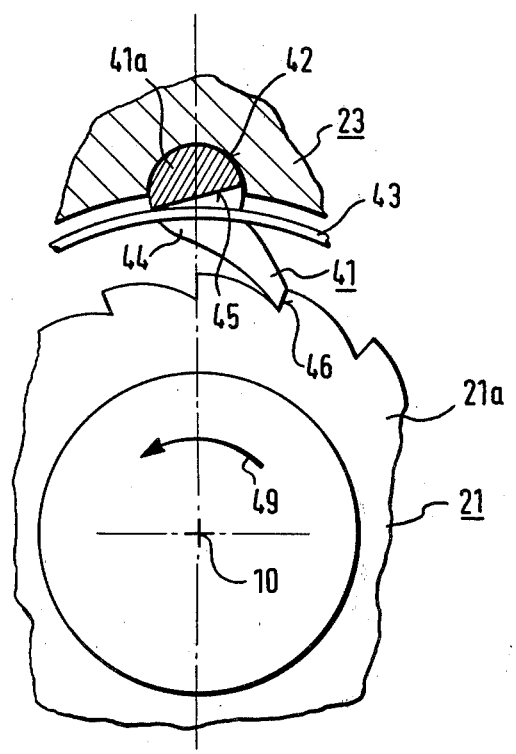
FIG. 2 is a partial sectional view taken in the direction of the arrow II in FIG. 1 and illustrating the interaction of a second pawl with second ratchet teeth.

In addition, a second pawl 41 is arranged on the carrier ring 23 and is illustrated in greater detail in FIG. 2. Second pawl 41 is supported via bearing head 41a in a step bearing 42 on the carrier ring 23. An annular spring 43 is positioned in a slot 44 of the pawl 41 and presses against the bottom 45 of the slot so that it tends to rotate the pawl 41 in a clockwise direction as viewed in FIG. 2 and, thus, brings the pawl into engagement with second ratchet teeth 46 formed on the bearing neck 21a of the planet gear carrier 21. FIG. 2 shows the engaged position between the pawl 41 and the second ratchet teeth 46. In the shifting position of FIG. 1, the second pawl 41 is lifted clear of the second ratchet teeth 46. This movement is achieved, as illustrated in FIG. 1, when the tip of the second pawl 41 is pushed over the conical control surface 47 on the planet gear carrier 21.

As described above, only one first pawl 34 and one second pawl 41 have been mentioned. A plurality of such first and second pawls, however, can be distributed over the circumference of the carrier ring 23.

In the position illustrated in FIG. 1, the carrier ring 23 is rigidly connected through its external gear teeth 33 to the internal gear teeth 32 and, thus, to the driver 12 so that it rotates with the driver. Therefore, the carrier ring rotates together with the driver in the direction of rotation indicated by the arrow 48 in FIG. 3. The rotational movement of the carrier ring 23 is transmitted over the first pawl 34 to the first ratchet teeth 36 and then over the bearing insert 37 to the hub sleeve 15. As a result, the rate of rotation of the hub sleeve corresponds to the rate of rotation or rotational speed of the driver 12. This arrangement is characterized as a direct drive. In this arrangement, the planetary gear system is not operative and rotates freely. Due to the arrangement of first ratchet teeth 36 on the bearing insert 37 fixed to the hub sleeve 15 and the first pawl 34 secured on the carrier ring 23, note FIGS. 1 and 3, the hub sleeve 15 can overrun when the hub sleeve rotates faster than the first pawl.

If, starting from the shifting position illustrated in FIG. 1, the carrier ring 23 is moved to the left by means of the shift rod 25, the external gear teeth 33 on the carrier ring are moved out of engagement with the internal gear teeth 32 on the driver. At the same time, second pawl 41 is moved out of contact with the control surface 47 and reaches the position illustrated in FIG. 2 in which it engages the second ratchet teeth 46 of the planet gear carrier 21. The planet gear carrier is driven at a stepped down rate of rotational speed to a slower speed by means of the driver 12 via the planet gear 22 which rolls on the sun gear 20 and the internal gear teeth 32. This stepped down slower speed of the planet gear carrier 21 is transmitted by the second ratchet teeth 46 and the second pawl 41 in the direction of the arrow 49 in FIG. 2 to the carrier ring 23 and then is transmitted from the carrier ring 23 over the first pawl 34 and the first ratchet teeth 36 in the direction of the arrow 48 of FIG. 3 to the bearing insert 37 and, thus, to the hub sleeve 15. Accordingly, hub sleeve 15 rotates at a stepped down slower speed relative to the rotational speed of the driver 12. Accordingly, this arrangement is characterized as a stepped down or slower drive.

Further, the following characteristics of the hub drive are considered to be important. The planetary gear system 19 and the carrier ring 23 with the first pawl 34 and the second pawl 41 are concentrated at the right-hand end of the drive hub within a relatively small axially extending space. For this concentrated arrangement, it is important that the planet gear carrier 21 along with the planet gear 22 is arranged within the axial extension of the internal gear teeth 32 with these internal gear teeth extending into at least a portion of the axial range of the sprockets 18a–18e. Further, it is also important that the first pawl 34 and the second pawl 41 overlap one another in the axial direction. With the planetary gear system 19 and the carrier ring 23 located at the right-hand end of the drive hub as shown in the drawing, the shape of the hub sleeve 15 as illustrated in FIG. 1, results. Hub sleeve 15 has a slender neck 15a followed to the right in FIG. 1 by a conical transition zone 15b and then a cylindrical end zone 15c. The diameter of the slender cylindrical neck 15a is essentially determined by the diameter of the compression spring 29 and the diameter of the bearing bush 31 which has a diameter that can be kept very small. As a result, the drive hub displayed in FIG. 1 has a very slender and sporty appearance. The diameter of the cylindrical neck 15a can be about 200% or at most 300% of the diameter of the hub shaft. The axial length of the slender neck 15a extends for at least 40%, preferably at least 50%, and optimally more than 60%, of the axial length of the hub sleeve 15 as measured between the spoke flanges 15d and 15e.

It should be noted that the ball bearing 17 is located in a bearing insert 50 on the hub sleeve 15. Bearing insert 50 is pressed into the hub sleeve 15. Bearing inserts 37 and 50 are formed of steel. If necessary, the hub sleeve 15 can be formed of a light metal.

The bicycle chain, not shown, can run over each of the five sprockets 18a–18e, each of which is equipped with a different number of teeth so that five different speed ratios can be chosen by shifting the chain. For each of the basic speed ratios determined by the selection of a particular sprocket, another speed ratio change can be effected by shifting the planetary gear system 19 whereby a total of 10 shifting stages are possible.

Another feature of the invention which must be considered is that the rate of rotation of the hub sleeve corresponds either to the rate of rotation of the driver 12 or is stepped down to a slower speed relative to the rotational speed of the driver 12 and, therefore, it becomes possible to choose a relatively high ratio of the diameter of the sprocket wheel arranged at the crank relative to the sprockets 18a–18e arranged on the driver. In this manner, the sprocket wheel arranged on the crank may be relatively large so that it corresponds to the conventional size used in sport bicycles.

While specific embodiments of the invention have been shown and described in detail to illustrate the application of the inventive principles, it will be understood that the invention may be embodied otherwise without departing from such principles.

What is claimed is:

1. Drive hub for bicycles comprising an axially extending hub shaft having an axis, an outer diameter, a first end and a second end, a driver supported on said hub shaft adjacent the first end thereof, a plurality of sprockets on said driver, said plurality of sprockets extending over a predetermined axial extent, a hub sleeve laterally enclosing said hub shaft and supported on said hub shaft closer to the second end thereof and supported on said driver closer to the first end of said hub shaft, a planetary gear system encircling said hub shaft and enclosed by said hub sleeve and driver, said planetary gear system arranged to transmit driving force from said driver to said hub sleeve and comprising a sun gear fixed to said hub shaft, a planet gear carrier rotatably mounted about said hub shaft, an annular gear with internal gear teeth of predetermined axial length being spaced radially outwardly from and rotatable around said hub shaft, and at least one planet gear mounted on said planet gear carrier for engagement with said sun gear and with said internal gear teeth on said annular gear, means for selectively coupling said hub sleeve with one of said annular gear and said planet gear carrier, means for shifting said coupling means, said shifting means including transmission means, said hub shaft having a bore therein extending from one of said ends toward the other of said ends with said transmission means extending through said bore, and wherein the improvement comprises that said annular gear is fixed to said driver, said coupling means comprises a carrier ring arranged to be selectively coupled for common rotation with one of said driver and said planet gear carrier, at least one first pawl being positioned on said carrier ring, first inner ratchet teeth formed on said hub sleeve, said first pawl being engaged with said first inner ratchet teeth.

2. Drive hub, as set forth in claim 1, wherein said annular gear is formed integrally with said driver.

3. Drive hub, as set forth in claim 1 wherein said carrier ring has external gear teeth formed thereon selectively engageable with said internal gear teeth on said annular gear.

4. Drive hub, as set forth in claim 3, wherein at least one second pawl is located on said carrier ring, second ratchet teeth are arranged on said planet gear carrier, and said second pawl is selectively engageable with said second ratchet teeth.

5. Drive hub, as set forth in claim 4, wherein said second ratchet teeth are located on an external surface of said planet gear carrier.

6. Drive hub, as set forth in claim 5, wherein said shifting means comprise a control surface formed on said planet gear carrier and said second pawl movably displaceable into engagement with said control surface so that upon axial movement of said carrier ring said second pawl moves axially relative to said control surface in and out of engagement respectively therewith, with said second pawl out of engagement with said control surface being engageable with said second ratchet teeth.

7. Drive hub, as set forth in claim 6, wherein said carrier ring is movable in the axial direction of said hub shaft between a pair of end positions, in one end position said carrier ring being connected to said driver for effecting torque transmission and in said second position said carrier ring being connected to said planet gear carrier for effecting torque transmission.

8. Drive hub, as set forth in claim 7, wherein said planet gear carrier has a lateral bearing neck enclosing said hub shaft and extending in the axial direction of said hub shaft, said carrier ring enclosing said bearing neck of said planet gear carrier, said planet gear carrier being axially fixed relative to said hub shaft, said carrier ring being axially movable relative to said bearing neck, and said second ratchet teeth and said control surface being arranged on the radially outer surface of said bearing neck.

9. Drive hub, as set forth in claim 8, wherein said planet gear carrier has a radial flange extending radially outwardly from said bearing neck and a bearing pin extending from said radial flange in the axial direction of said hub shaft, said planet gear supported on said bearing pin, and said radial flange and said bearing pin being located radially inwardly from and in the region of the axial length of said internal gear teeth.

10. Drive hub, as set forth in claim 1, wherein said internal gear teeth extend in the axial direction of said hub shaft for at least a portion of the axial extent of said sprockets on said driver.

11. Drive hub, as set forth in claim 4, wherein said first pawl and said second pawl at least partially overlap one another in the axial direction of said hub shaft.

12. Drive hub, as set forth in claim 11, wherein said hub sleeve has a bearing insert at at least one end thereof with a balls bearing located within said insert for supporting said hub sleeve on at least one of said driver and said hub shaft.

13. Drive hub, as set forth in claim 12, wherein said bearing insert is located in the end of said hub sleeve closer to the second end of said hub shaft and said first ratchet teeth being formed in said bearing insert.

14. Drive hub, as set forth in claim 1, wherein said hub sleeve has a pair of spoke flanges having a predetermined axial spacing thereon spaced apart in the axial direction of said hub shaft, said hub sleeve having a slender sleeve-like neck closely laterally enclosing said hub shaft and having a length of at least 40% of the axial spacing between said spoke flanges and having a diameter of at most 300% of the diameter of said hub shaft.

15. Drive hub, as set forth in claim 14, wherein said sleeve-like neck has an axial length of at least 50% of the axial spacing between said spoke flanges.

16. Drive hub, as set forth in claim 15, wherein said sleeve-like neck has an axial length of at least 60% of the axial spacing between said spoke flanges.

17. Drive hub, as set forth in claim 16, wherein said sleeve-like neck has a diameter of about 200% of the diameter of said hub shaft.

* * * * *